(12) United States Patent
Fanning (10) Patent No.: US 12,090,438 B2
(45) Date of Patent: Sep. 17, 2024

(54) DUST EXTRACTION DEVICE

(71) Applicant: Fanca Technologies Pty Ltd, Queensland (AU)

(72) Inventor: Andrew Fanning, Queensland (AU)

(73) Assignee: FANCA TECHNOLOGIES PTY LTD, Queensland (AU)

( * ) Notice: Subject to any disclaimer, the term of this patent is extended or adjusted under 35 U.S.C. 154(b) by 622 days.

(21) Appl. No.: 17/294,184

(22) PCT Filed: Nov. 6, 2019

(86) PCT No.: PCT/AU2019/051218
§ 371 (c)(1),
(2) Date: May 14, 2021

(87) PCT Pub. No.: WO2020/097671
PCT Pub. Date: May 22, 2020

(65) Prior Publication Data
US 2022/0118396 A1  Apr. 21, 2022

(30) Foreign Application Priority Data
Nov. 15, 2018 (AU) .............................. 2018904361

(51) Int. Cl.
*B01D 53/02* (2006.01)
*B01D 46/62* (2022.01)

(52) U.S. Cl.
CPC .......... *B01D 46/62* (2022.01); *B01D 2273/30* (2013.01)

(58) Field of Classification Search
CPC .... B01D 2273/30; B01D 46/12; B01D 46/58; B01D 46/62; F24F 13/28; F24F 2221/12; F24F 8/108
See application file for complete search history.

(56) References Cited

U.S. PATENT DOCUMENTS

| 4,378,728 A | 4/1983 | Berkmann | |
| 4,490,162 A * | 12/1984 | Davis | B01D 50/20 96/402 |
| 5,421,846 A | 6/1995 | Klimczak | |
| 5,597,393 A * | 1/1997 | Johnson | B01D 46/00 55/467 |
| 10,898,845 B2 * | 1/2021 | Fanning | B01D 46/521 |

(Continued)

FOREIGN PATENT DOCUMENTS

| AU | 2016101414 | 9/2016 |
| AU | 2016101414 A4 | 9/2016 |

(Continued)

OTHER PUBLICATIONS

International Search Report for International Application No. PCT/AU2019/051218 dated Feb. 14, 2020, 4 pages.

(Continued)

*Primary Examiner* — Christopher P Jones
(74) *Attorney, Agent, or Firm* — Wegman Hessler Valore (57) ABSTRACT

A dust extraction device for filtering air, the dust extraction device including one or more filter housing, each having at least one air filter, an inlet housing fluidly connected to the filter housing, a fan assembly including a fan, a fan inlet and a fan outlet, the fan assembly fluidly connecting the filter housing to the fan outlet, and a support frame for supporting the filter housing, inlet housing and the fan assembly.

15 Claims, 6 Drawing Sheets

(56) References Cited

U.S. PATENT DOCUMENTS

| | | |
|---|---|---|
| 2013/0192467 A1 | 8/2013 | Lyras |
| 2013/0197829 A1* | 8/2013 | Sherman, III ..... B01D 46/0086 |
| | | 702/45 |
| 2014/0047806 A1 | 2/2014 | Heidenreich |
| 2017/0209891 A1 | 7/2017 | Wieland et al. |
| 2019/0030476 A1* | 1/2019 | Fanning ............ B01D 46/0086 |

FOREIGN PATENT DOCUMENTS

| | | |
|---|---|---|
| AU | 2017101033 | 8/2017 |
| AU | 2017101033 A4 | 8/2017 |
| CN | 205235618 | 5/2016 |
| CN | 205235618 U | 5/2016 |
| CN | 107998766 A | 5/2018 |
| EP | 0296278 A1 | 12/1988 |
| GB | 767220 | 1/1957 |
| GB | 767220 A | 1/1957 |

OTHER PUBLICATIONS

Written Opinion of the International Searching Authority for International Application No. PCT/AU2019/051218 dated Feb. 14, 2020, 4 pages.
International Search Report and Written Opinion of International Application No. PCT/AU2019/051218 filed Nov. 6, 2019, dated Feb. 14, 2020, 12 pages.

* cited by examiner

DUST EXTRACTION DEVICE

CROSS REFERENCE TO RELATED APPLICATION

This application is a national phase of International Patent Application No. PCT/AU2019/051218 filed Nov. 6, 2019, which claims the priority filing benefit of Australian Patent Application No. 2018904361 filed Nov. 15, 2018, which are incorporated herein by reference in their entirety.

FIELD OF INVENTION

The present invention relates to a dust extraction device. The present invention has particular but not exclusive application for a portable dust extraction device. Reference will be made in the specification to use of the invention for filtering air. This use is by way of example only and the invention is not limited to this use.

BACKGROUND OF THE INVENTION

Dust extraction systems are used to remove dust (including other airborne particulates) from an environment. Dust extraction is important as excess exposure to dust and particulates can cause illness and damage to lungs. Industrial premises such as factories that produce dust and airborne particulates typically have dedicated dust extraction systems.

Dedicated dust extraction systems are generally large purpose built systems that extract dust and particulates from captured air and exhaust cleaned air.

A problem with these dedicated systems is that they are installed at a particular location.

Another problem with these dedicated systems is that they are typically installed in multiple parts.

Being in a fixed location, the extraction systems cannot adequately service other nearby locations should the industrial processes be relocated or new processes commenced.

These fixed extraction systems are not transportable. The fixed extraction systems also require significant cost and time to install and decommission.

There are a number of transportable systems. However, these are relatively small and do not typically have the same throughput as dedicated systems.

Object of the Invention

It is an object of the present invention to overcome or at least alleviate one or more of the above mentioned problems with dust extraction systems and/or provide the consumer with a useful or commercial choice.

SUMMARY OF THE INVENTION

In one aspect the present invention broadly resides in a dust extraction device for filtering air, the dust extraction device including:
one or more filter housing, each having at least one air filter;
an inlet housing fluidly connected to the filter housing;
a fan assembly including a fan, a fan inlet and a fan outlet, the fan assembly fluidly connecting the filter housing to the fan outlet; and
a support frame for supporting the filter housing, inlet housing and the fan assembly.

Preferably the inlet housing includes at least one inlet for introducing air. Preferably the inlet housing includes at least one baffle plate. Preferably the at least one baffle plate deflects the introduced air. Preferably the at least one baffle plate is tilted in a backwards direction relative to the direction of flow of the introduced air through the at least one inlet.

Preferably the dust extraction device further includes a hopper. Preferably the hopper is located beneath the inlet housing. Preferably the hopper is fluidly connected to the inlet housing. Preferably the hopper is located beneath the filter housing. Preferably the hopper is fluidly connected to the filter housing. More preferably the hopper is fluidly connected to the inlet portion of each of the one or more filter housing. More preferably the hopper is located beneath the inlet housing and the filter housing. Preferably the hopper has a separator that inhibits flow of air between the inlet housing and the filter housing via the hopper. Preferably the hopper collects dust that drops down from the inlet housing and from the filter housing.

Preferably the dust extraction device further includes a conveyor. Preferably the conveyor is located below the hopper. Preferably the conveyor is fluidly connected to the hopper. Preferably the conveyor is adapted to convey dust collected by the hopper towards a discharge outlet. Preferably the discharge outlet discharges dust from the dust extraction device. Preferably the conveyor is an auger conveyor. Preferably the conveyor is hydraulically driven. Preferably a valve is located between the conveyor and the discharge outlet. Preferably the valve inhibits air from being introduced into the dust extraction device via the discharge port. Preferably the valve is a rotary valve.

Preferably the fan is driven by a motor. Preferably the motor is an electric motor. Alternatively, the motor may be a hydraulic motor, variable speed diesel motor, internal combustion motor, or the like.

Preferably the fan produces a vacuum to move air through the dust extraction device. Preferably the fan is a centrifugal fan. Preferably the fan has a capacity of between 20 m$^3$/s and 100 m$^3$/s. Preferably the fan has a capacity of between 60 m$^3$/s and 80 m$^3$/s. More preferably the fan has a capacity of between 50 m$^3$/s and 70 m$^3$/s.

Preferably each of the at least one air filter is a fibrous media filter. More preferably each of the at least one air filter is a pleated fibrous media filter. For example, each of the at least one air filter may be a pleated paper air filter.

Preferably each of the one or more filter housing has an outlet portion and an inlet portion. Preferably each of the one or more filter housing has an upper outlet portion and a lower inlet portion. Preferably each of the at least one air filter fluidly connects the inlet portion to the outlet portion.

Preferably the one or more filter housing is a plurality of filter housings. Preferably the inlet portion of each of the one or more filter housing is fluidly connected to the inlet portion of an adjacent filter housing. Preferably each of the plurality of filter housings is modular, adapted to connect to an adjacent filter housing on a first side and a further adjacent filter housing on a second side. Preferably the first side is at substantially 90° to the second side. More preferably, each filter housing is further adapted to connect to another adjacent filter housing on a third side. Preferably the third side is at substantially 90° to the second side. Preferably the third side is opposed to the first side.

In one embodiment, the plurality of filter housings is four filter housings. Preferably the four filter housings are arranged two filter housings long and two filter housings wide. In another embodiment, the plurality of filter housings is six filter housings. Preferably the six filter housings are arranged three filter housings long and two filter housings wide. In another embodiment, the plurality of filter housings is eight filter housings. Preferably the eight filter housings are arranged four filter housings long and two filter housings wide. In another embodiment, the plurality of filter housings is ten filter housings. Preferably the ten filter housings are arranged five filter housings long and two filter housings wide. In another embodiment, the plurality of filter housings is twelve filter housings. Preferably the twelve filter housings are arranged six filter housings long and two filter housings wide. In another embodiment, the plurality of filter housings is fourteen filter housings. Preferably the fourteen filter housings are arranged seven filter housings long and two filter housings wide. In another embodiment, the plurality of filter housings is sixteen filter housings. Preferably the sixteen filter housings are arranged eight filter housings long and two filter housings wide.

Preferably the dust extraction device further includes an air compressor. Preferably the air compressor is located in an air compressor housing. Preferably the air compressor provides compressed air which is blown across the at least one air filter to displace dust that has been filtered from the air. Preferably the displaced dust drops down to the hopper.

Preferably the dust extraction device further includes a manifold portion located adjacent the fan inlet and adjacent one or more filter housing adjacent the fan inlet. Preferably, the manifold portion fluidly connects the outlet portions of the one or more filter housing adjacent the fan inlet to the fan inlet. Preferably, the manifold portion fluidly connects the outlet portions of the one or more filter housing adjacent the fan inlet to the fan inlet in addition to the outlet portions being connected to the fan inlet. Preferably in this manner, the increase in flow rate through the outlet portions from the inlet housing end of the one or more filter housing to the fan inlet end of the one or more filter housing is accommodated by the manifold portion. Preferably the manifold portion effectively increases the volume of the outlet portions of the one or more filter housing towards the fan inlet end of the one or more filter housing. Preferably the manifold portion increases in size towards the fan inlet end of the one or more filter housing. Preferably the portion of the manifold portion adjacent to the one or more filter housing has a substantially triangular cross section. Preferably the portion of the manifold portion adjacent to the fan inlet has a substantially rectangular cross section. Preferably the manifold portion decreases air velocity variation for lower flow resistance between the outlet portions and the fan inlet. Preferably the manifold portion increased stability of air flow from the outlet portions into the fan inlet.

In one embodiment, the manifold portion is located adjacent two filter housings. In another embodiment, the manifold portion is located adjacent four filter housings. In a further embodiment, the manifold portion is located adjacent six filter housings. In another embodiment, the manifold portion is located adjacent eight filter housings.

Preferably the dust extraction device further includes a hydraulic pump. The hydraulic pump preferably provides hydraulic force to the hydraulic motor that drives the fan. The support frame preferably supports the hydraulic pump. The hydraulic pump is preferably driven by a motor. The motor that drives the hydraulic pump is preferably a diesel motor.

Preferably the dust extraction device further includes a computer processing unit (CPU). Preferably the CPU is located in a control housing. Preferably the CPU is adapted to control and monitor the dust extraction device. Preferably the CPU is adapted to control the fan. More preferably the CPU is adapted to control the motor that drives the fan. Preferably the CPU is adapted to control the conveyor. Preferably the CPU is adapted to control the valve. Preferably the CPU is adapted to control the air compressor. Preferably the CPU is adapted to monitor the fan. More preferably the CPU is adapted to monitor at least one sensor attached to the fan. Preferably the CPU is adapted to monitor an emission sensor. Preferably the emission sensor is located in the fan outlet. Preferably the emission sensor is a broken bag detector. Preferably the CPU is adapted to monitor the at least one air filter. Preferably the CPU is adapted to monitor airflow through the dust extraction device. Preferably the dust extraction device includes differential pressure sensors. Preferably the differential pressure sensors are located before and after the at least one air filter to indicate if the at least one air filter is blocked or if there are higher than normal dust readings. The CPU is preferably adapted to receive sensor readings from the differential pressure sensors.

In one embodiment, the support frame has substantially the same base dimensions as a 40' intermodal container. Preferably, the support frame has substantially the same base dimensions as a 40' intermodal container. Preferably the support frame is adapted to be transported on 40' intermodal container bolsters. Preferably the support frame complies with ISO standard 668. Preferably the support frame complies with ISO standard 1496-1.

In a further aspect the present invention broadly resides in a dust extraction device including:
  a filter housing having at least one air filter;
  an inlet housing fluidly connected to the filter housing;
  a fan assembly including a fan, a fan inlet and a fan outlet, the fan assembly fluidly connecting the filter housing to the fan outlet; and
  a support frame for supporting the filter housing, inlet housing and the fan assembly,
  wherein in use, the fan moves air from the inlet housing through the filter housing, through the fan inlet and out through the fan outlet, and wherein the at least one air filter filters the air.

Preferably the dust extraction device is a dust extraction device as described in this specification.

In a further aspect the present invention broadly resides in a method of filtering air using a dust extraction device as described in this specification, including the steps of:
  positioning a dust extraction device in a desired location;
  introducing air into the dust extraction device; and
  moving the air through a filter housing having at least one air filter to filter the air.

Preferably the method further includes the step of diverting the introduced air using a baffle plate.

Preferably the step of moving the air through a filter housing having at least one air filter to filter the air includes using a fan to move the air. Preferably the fan is a centrifugal fan.

In another aspect the present invention broadly resides in a dust extraction device for filtering air, the dust extraction device including:
  a plurality of filter housings, each having an inlet portion, an outlet portion and at least one air filter fluidly connecting the inlet portion to the outlet portion;
  an inlet housing fluidly connected to the inlet portions of the plurality of filter housings;

a fan assembly including a centrifugal fan, a fan inlet and a fan outlet, the fan assembly fluidly connecting the outlet portions of the plurality of filter housings to the fan outlet; and a support frame for supporting the filter housing, inlet housing and the fan assembly.

Preferably the fan has a capacity of between 20 m$^3$/s and 100 m$^3$/s. Preferably the fan has a capacity of between 60 m$^3$/s and 80 m$^3$/s. More preferably the fan has a capacity of between 50 m$^3$/s and 70 m$^3$/s.

In a further aspect, the present invention broadly resides in a dust extraction device for filtering air, the dust extraction device including:

a plurality of filter housings, each having an inlet portion, an outlet portion and at least one air filter fluidly connecting the inlet portion to the outlet portion;

an inlet housing fluidly connected to the inlet portions of the plurality of filter housings;

a fan assembly including a fan, a fan inlet and a fan outlet, the fan inlet fluidly connected to the outlet portions of the plurality of filter housings;

a manifold located adjacent the fan inlet and adjacent the plurality of filter housings towards the fan inlet, the manifold further fluidly connecting the fan inlet to the outlet portions of the plurality of filter housings; and a support frame for supporting the filter housing, inlet housing and the fan assembly.

Preferably the manifold increases in size from the plurality of filter housings towards the fan inlet. Preferably the manifold increases in size towards the fan inlet end of the one or more filter housing. Preferably a portion of the manifold adjacent to the one or more filter housing has a substantially triangular cross section. Preferably a portion of the manifold adjacent to the fan inlet has a substantially rectangular cross section.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
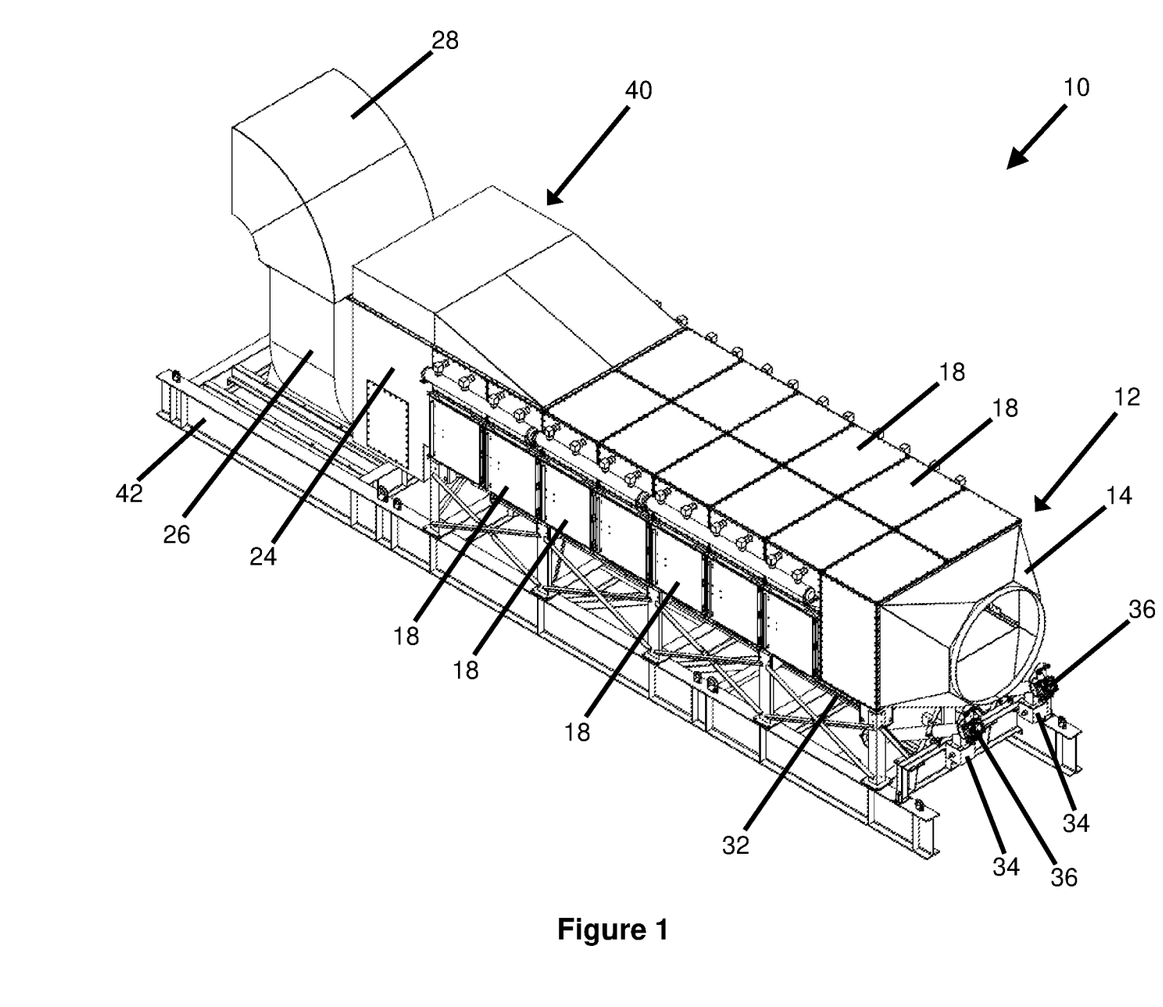
FIG. 1 is an isometric front view of a dust extraction device according to an embodiment of the present invention.
Figure 2:
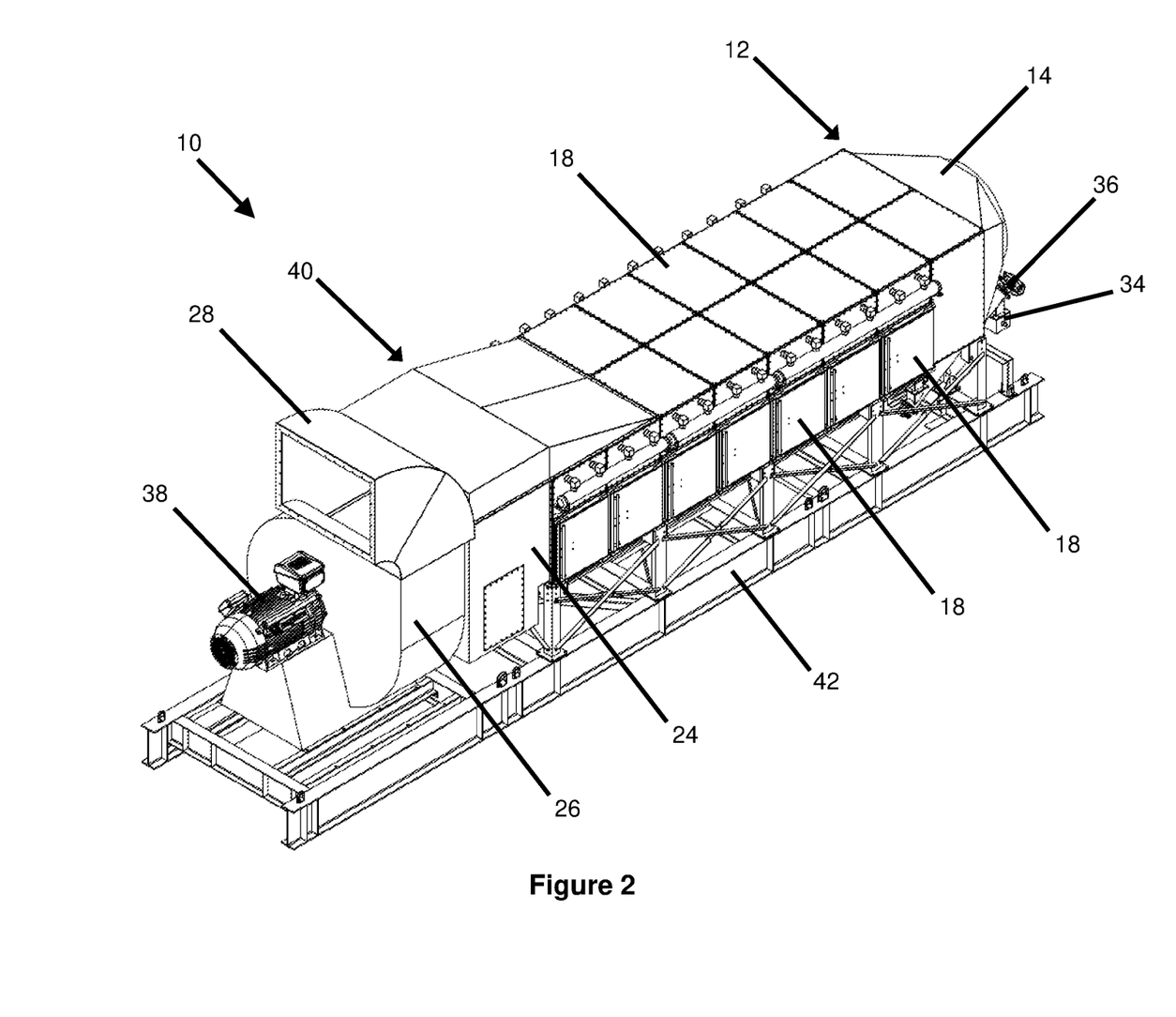
FIG. 2 is an isometric rear view of the dust extraction device of FIG. 1.
Figure 3:
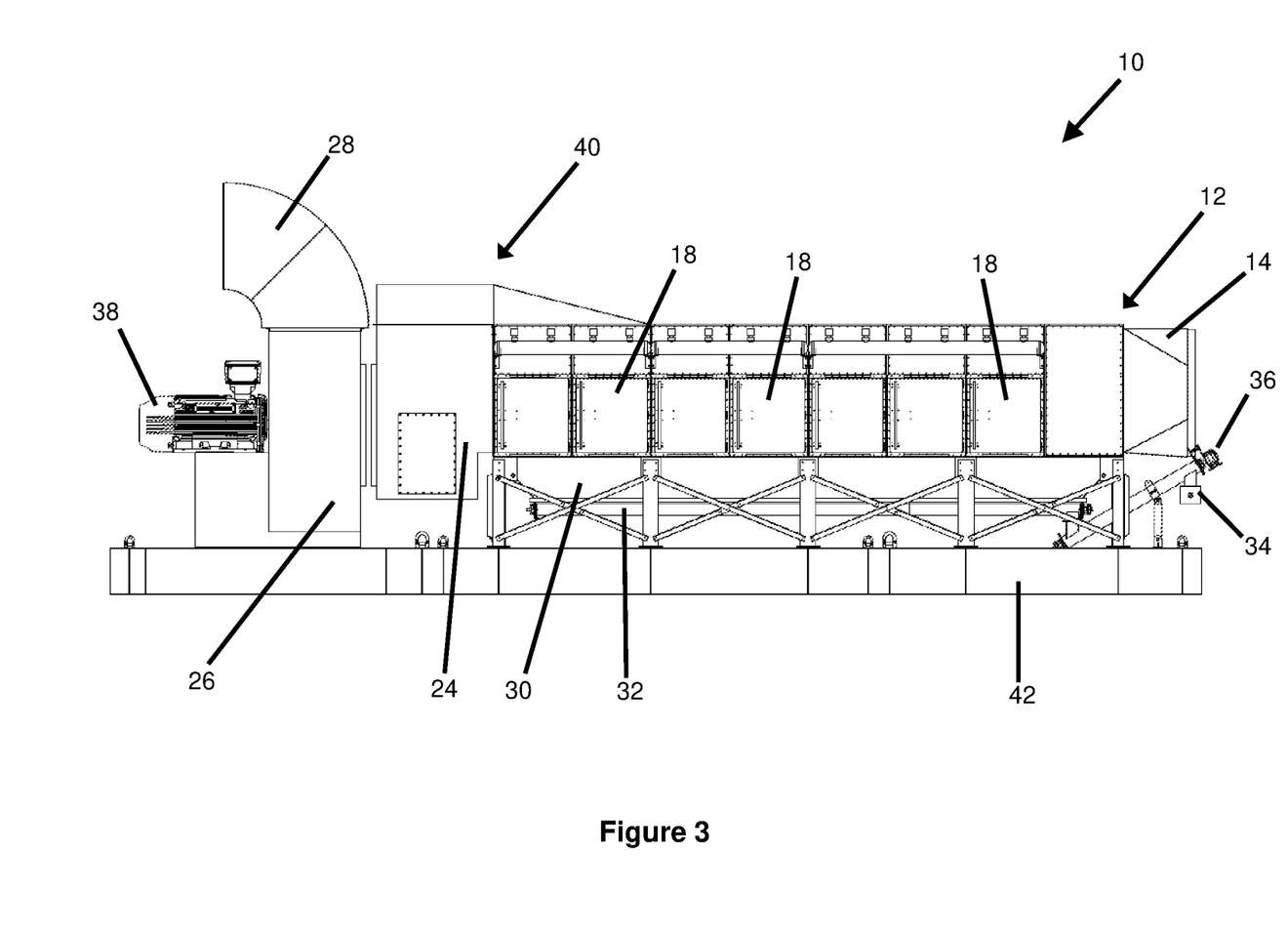
FIG. 3 is a side view of the dust extraction device of FIG. 1.
Figure 4:
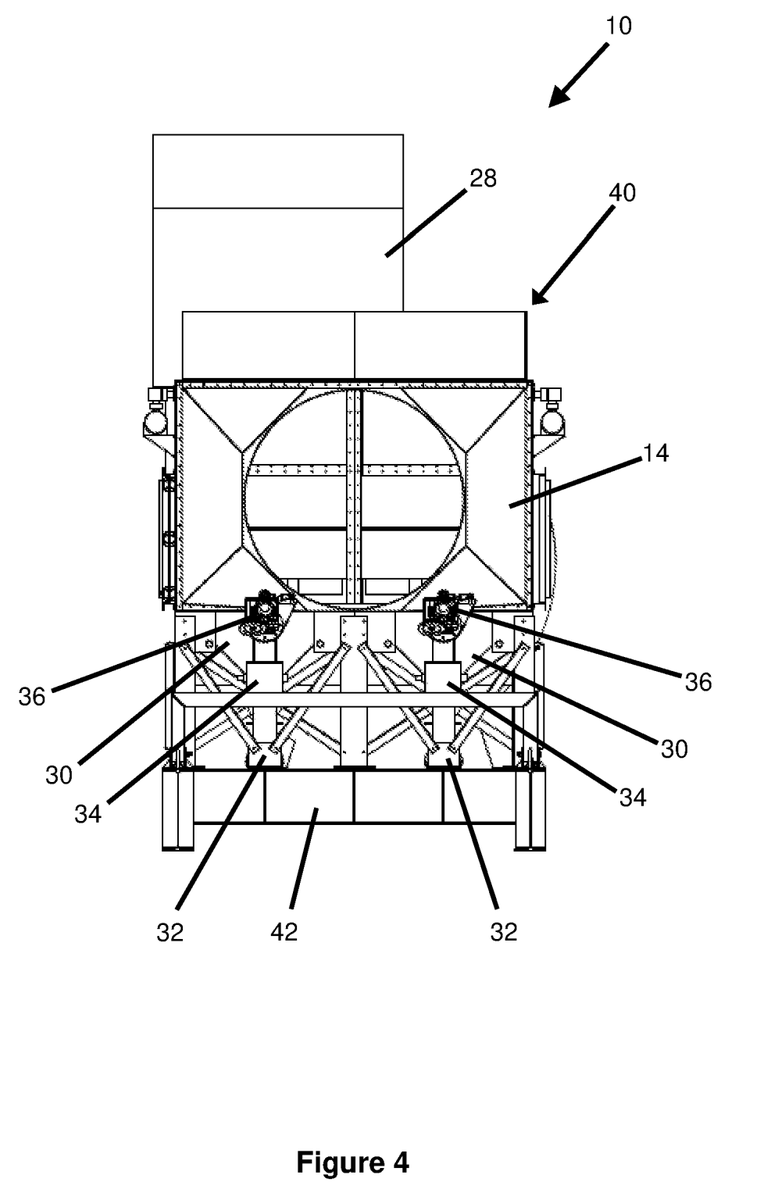
FIG. 4 is an end view of the dust extraction device of FIG. 1.
Figure 5:
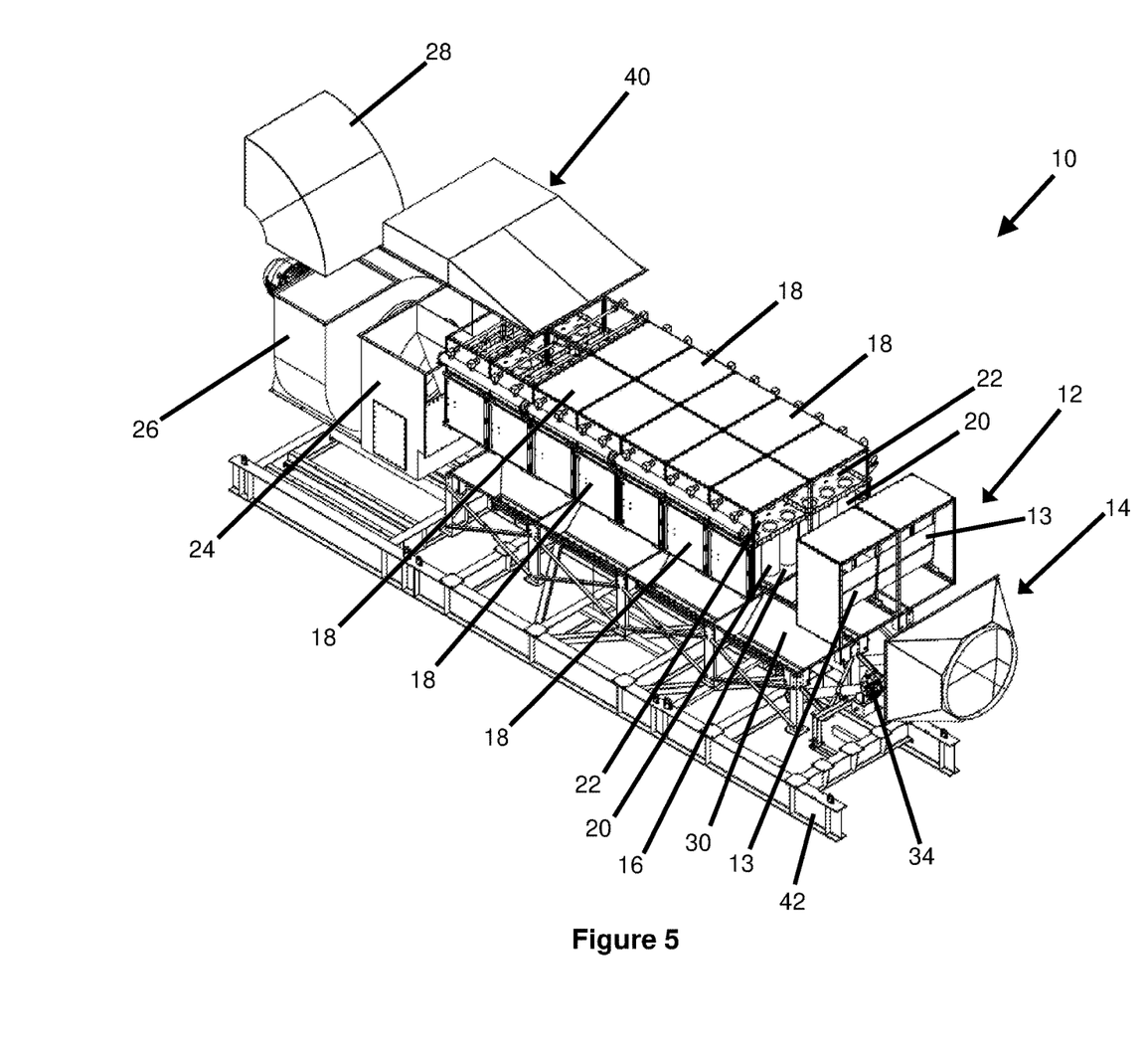
FIG. 5 is an isometric exploded view of the dust extraction device of FIG. 1.
Figure 6:
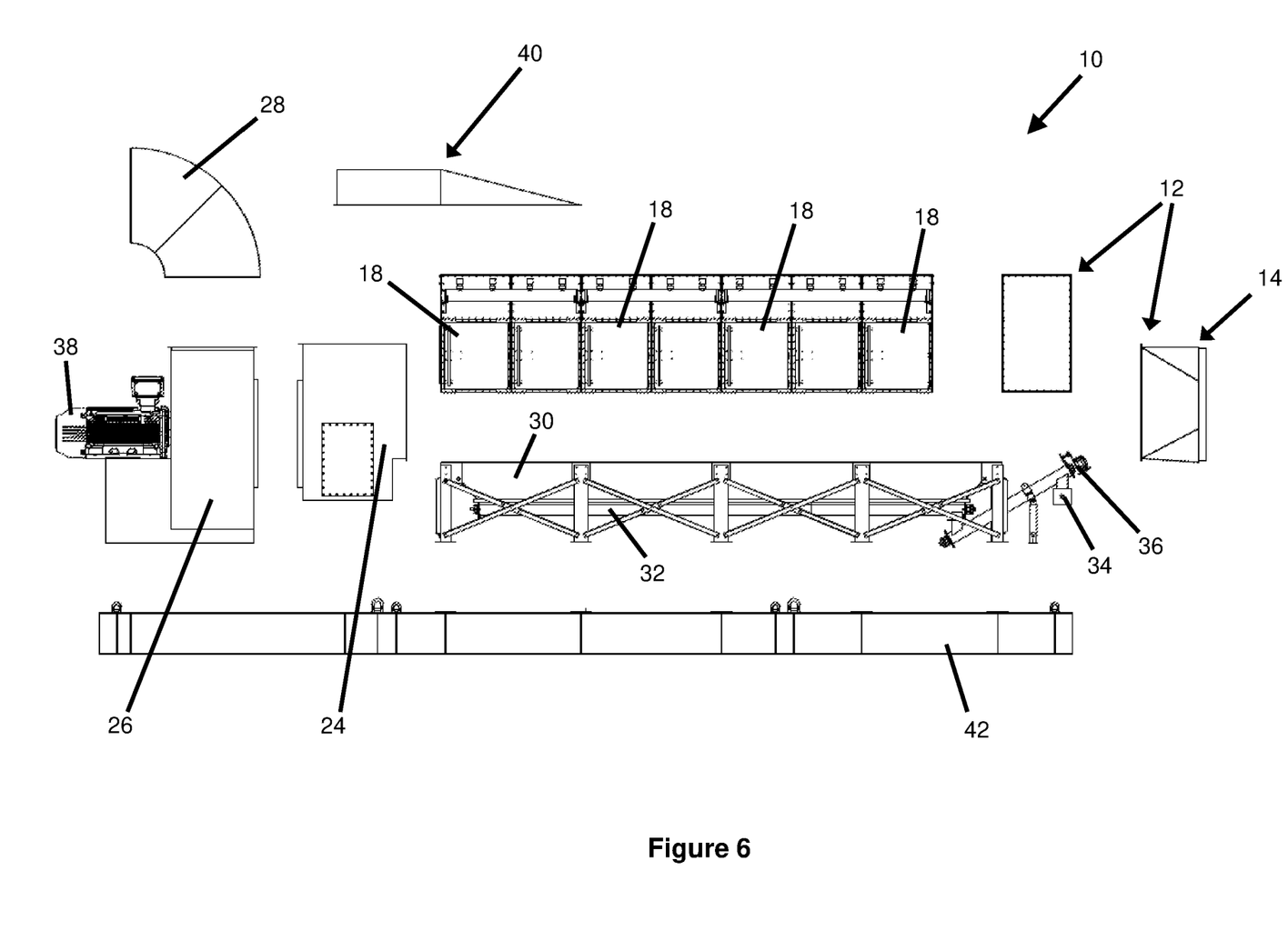
FIG. 6 is an exploded side view of the dust extraction device of FIG. 1.

With reference to FIGS. 1 to 6 there is shown a dust extraction device 10. The dust extraction device 10 has an inlet housing 12, having an inlet 14. The inlet housing 12 has baffles 13. The inlet housing 12 is fluidly connected to inlet portions 16 of a plurality of filter housings 18. Air filters 20 fluidly connect the inlet portions 16 of the plurality of filter housings 18 to outlet portions 22 of the plurality of filter housings 18. The outlet portions 22 of the plurality of filter housings 18 are fluidly connected to a fan inlet 24 of a fan in the form of a centrifugal fan 26, which is fluidly connected to a fan outlet in the form of an exhaust 28.

The inlet portions 16 of the plurality of filter housings 18 are fluidly connected. The outlet portions 22 of the plurality of filter housings 18 are fluidly connected.

Hoppers 30 are located beneath the inlet housing 12 and the plurality of filter housings 18 and fluidly connected to both the inlet housing 12 and the inlet portions 16 of the plurality of filter housings 18. Conveyor in the form of an auger conveyors 32 are located beneath the hoppers 30. The auger conveyors 32 are connected to discharge ports 34 via a rotary valve 36.

A motor in the form of an electric motor 38 drives the centrifugal fan 26.

A manifold portion 40 is located adjacent the fan inlet 24 and four of the plurality of filter housings 18 that are adjacent to the fan inlet 24. The manifold portion 40 provides additional space for air to flow from the outlet portions 22 of the plurality of filter housings 18 to the fan inlet 24. As air flows through the filter housings 18 from the inlet housing 12 to the fan inlet 24, the volume of air flowing through the outlet portions 22 increases. The manifold portion 40 accommodates this increase in airflow. The fluid connection between the outlet portions 22 of the plurality of filter housings 18 to the fan inlet 24 via the manifold portion 40 is in addition to the direct fluid connection between the outlet portions 22 of the plurality of filter housings 18 and the fan inlet 24. The manifold portion 40 has a substantially triangular cross section adjacent the plurality of filter housings 18 and a substantially rectangular cross section adjacent the fan inlet 24.

The dust extraction device 10 has an air compressor (not shown). The air compressor is fluidly connected to the plurality of filter housings 18. The air compressor is used to blow air across the air filters 20 to dislodge dust from the air filters 20. The dislodged dust then falls down towards the hoppers 30.

The dust extraction device 10 has a frame 42. The frame 42 supports the inlet housing 12, the filter housings 18, the centrifugal fan 26, the hoppers 30, the auger conveyors 32, the electrical motor 38 and the air compressor.

The dust extraction device has a CPU in the form of a control unit (not shown). The control unit controls the electric motor 38, which drives the centrifugal fan 26. The control unit controls the auger conveyors 32 and the rotary valves 36. The control unit monitors the centrifugal fan 26 using a sensor (not shown) to determine if the centrifugal fan 26 is rotating. The control unit monitors the air leaving the exhaust 28 using an emission sensor (not shown). The control unit monitors the air filters 20 using sensors (not shown) which measures the amount of dust on the air filters 20.

In use with reference to FIGS. 1-6, the centrifugal fan 26 is driven by the electrical motor 38 to move air to be filtered through the inlet 14, through the inlet housing 12, through the inlet portions 16 of a plurality of filter housings 18, through the air filters 20, through the outlet portions outlet portions 22 of the plurality of filter housings 18, through the fan inlet 24, through the centrifugal fan 26 and out through the exhaust 28.

As the air moves through the inlet housing 12, heavier particles of dust that drop down are collected by the hopper 24, as well as particles of dust that hit the baffles 13 and drop down. As the air moves through the air filters 20 in the plurality of filter housings 18, the dust that is filtered by the air filters 20 and drops down is collected by the hoppers 30. The dust collected by the hoppers 30 is funneled down to the auger conveyors 32, which convey the dust to the discharge ports 34. The rotary valves 36 enable the dust to discharge from the discharge port 34 while inhibiting air from being sucked into the dust extraction device 10 via the discharge port 34.

As dust collects on the air filters 20, compressed air from the air compressor (not shown) is blown across the air filters 20 to dislodge the dust. The dislodged dust then falls down towards the hoppers 30.

As the air moves through the plurality of filter housings 18 the air flow increases in the outlet portions 22 of the plurality of filter housings 18. The manifold portion 40 increases in size towards the fan inlet 24 to accommodate the increase in airflow.

Advantages

An advantage of the preferred embodiment of the dust extraction system includes that the dust extraction system can be easily transported and can be operational in a very short period of time. An advantage of a preferred embodiment of the dust extraction system of having a centrifugal fan is that the dust extraction system occupies a smaller footprint than a dust extraction system having a separate fan assembly. A further advantage of a preferred embodiment of the dust extraction system is that the manifold accommodates the increase in air flow rate through the outlet portions from the inlet housing end of the one or more filter housing to the fan inlet. Another advantage of a preferred embodiment of the dust extraction system is that the manifold portion accommodating an increase in air flow enables a larger number of filter housings and air filters to be utilized compared to a dust extraction system without a manifold portion.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A dust extraction device for filtering air, the dust extraction device including:
one or more filter housing, each having at least one air filter;
an inlet housing fluidly connected to the filter housing;
a fan assembly including a fan, a fan inlet and a fan outlet, the fan assembly fluidly connecting the filter housing to the fan outlet;
a support frame for supporting the filter housing, inlet housing and the fan assembly; and
a manifold portion located adjacent the fan inlet and adjacent one or more of the one or more filter housing adjacent the fan inlet,
wherein the manifold portions fluidly connects outlet portions of the one or more filter housing adjacent the fan inlet to the fan inlet;
wherein the manifold portion increases in size towards an end of the one or more filter housing adjacent the fan inlet.

2. A dust extraction device as claimed in claim 1, wherein the manifold portion fluidly connects the outlet portions of the one or more filter housing adjacent the fan inlet to the fan inlet in addition to the outlet portions being fluidly connected to the fan inlet.

3. A dust extraction device as claimed in claim 1, wherein the one or more filter housing is four or more filter housings, and the manifold portion is located adjacent and fluidly connected to four of the four or more filter housings.

4. A dust extraction device as claimed in claim 1, wherein the fan produces a vacuum to move air through the dust extraction device.

5. A dust extraction device as claimed in claim 4, wherein the fan has a capacity of between 20 $m^3$/s and 100 $m^3$/s.

6. A dust extraction device as claimed in claim 5, wherein the fan has a capacity of between 50 $m^3$/s and 70 $m^3$/s.

7. A dust extraction device as claimed in claim 1, wherein the support frame has substantially a same base dimensions as a 40' intermodal container, and wherein the support frame is adapted to be transported on 40' intermodal container bolsters.

8. A dust extraction device as claimed in claim 1, further including a hopper located beneath the inlet housing and the filter housing, wherein the hopper is fluidly connected to the filter housing, and fluidly connected to the inlet portion of each of the one or more filter housing.

9. A dust extraction device as claimed in claim 8 further including a conveyor located below the hopper and fluidly connected to the hopper, wherein the conveyor is adapted to convey dust collected by the hopper towards a discharge outlet.

10. A dust extraction device as claimed in claim 9, wherein a valve is located between the conveyor and the discharge outlet and wherein the valve inhibits air from being introduced into the dust extraction device via the discharge port.

11. A dust extraction device as claimed in claim 9, wherein the conveyor is an auger conveyor.

12. A dust extraction device for filtering air, the dust extraction device including:
a plurality of filter housings, each having an inlet portion, an outlet portion and at least one air filter fluidly connecting the inlet portion to the outlet portion;
an inlet housing fluidly connected to the inlet portions of the plurality of filter housings;
a fan assembly including a fan, a fan inlet and a fan outlet, the fan inlet fluidly connected to the outlet portions of the plurality of filter housings;
a manifold located adjacent the fan inlet and adjacent the plurality of filter housings towards the fan inlet, the manifold further fluidly connecting the fan inlet to the outlet portions of the plurality of filter housings; and
a support frame for supporting the filter housing, inlet housing and the fan assembly,
wherein the manifold increases in size towards an end of the plurality of filter housings adjacent the fan inlet.

13. A dust extraction device as claimed in claim 12, wherein the manifold increases in size from the plurality of filter housings towards the fan inlet.

14. A dust extraction device as claimed in claim 12, wherein a portion of the manifold adjacent to the plurality of filter housings has a substantially triangular cross section.

15. A dust extraction device as claimed in claim 12, wherein a portion of the manifold adjacent to the fan inlet has a substantially rectangular cross section.

\* \* \* \* \*